(12) United States Patent
Bolen

(10) Patent No.: US 9,547,557 B2
(45) Date of Patent: Jan. 17, 2017

(54) PERIPHERAL BUS ERROR CONTAINMENT AND RECOVERY

(71) Applicant: Dell Products L.P., Round Rock, TX (US)

(72) Inventor: Austin P. Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 14/537,450

(22) Filed: Nov. 10, 2014

(65) Prior Publication Data

US 2016/0132395 A1    May 12, 2016

(51) Int. Cl.
| | |
|---|---|
| G06F 11/00 | (2006.01) |
| G06F 11/14 | (2006.01) |
| G06F 11/07 | (2006.01) |
| G06F 13/24 | (2006.01) |
| G06F 13/40 | (2006.01) |

(52) U.S. Cl.
CPC ......... *G06F 11/141* (2013.01); *G06F 11/0793* (2013.01); *G06F 13/24* (2013.01); *G06F 13/4022* (2013.01)

(58) Field of Classification Search
USPC ....................................................... 714/5.11
See application file for complete search history.

(56) References Cited

U.S. PATENT DOCUMENTS

| | | | |
|---|---|---|---|
| 7,328,270 B1* | 2/2008 | Reents ................... | G06F 15/16 709/220 |
| 2005/0144318 A1* | 6/2005 | Chang ................... | G06F 1/3203 709/245 |
| 2011/0179314 A1* | 7/2011 | Patel ................... | G06F 11/0721 714/48 |
| 2015/0220409 A1* | 8/2015 | Shao ................... | G06F 11/2007 714/4.5 |

* cited by examiner

*Primary Examiner* — Sarai Butler
(74) *Attorney, Agent, or Firm* — Baker Botts L.L.P.

(57) ABSTRACT

A peripheral bus error containment and recovery system enables a bus device to experience a fatal bus error and recover without stopping execution of an operating system. When a fatal bus error is detected at the bus device, a bus controller may deactivate a data link layer for a downstream port populated by the bus device, causing an operating system device driver to be uninstalled for the bus device. Then, the operating system device driver may be reinstalled without physically removing the bus device.

21 Claims, 3 Drawing Sheets

PERIPHERAL BUS ERROR CONTAINMENT AND RECOVERY

BACKGROUND

Field of the Disclosure

This disclosure relates generally to information handling system displays and, more particularly, peripheral bus error containment and recovery.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include peripheral buses in the system architecture. A peripheral bus enables connectivity to external devices, such as plug-in cards, thereby providing a hardware expansion mechanism for the information handling system. Accordingly, peripheral buses may be supported by corresponding software architecture, including support by an operating system executing on the information handling system. One common example of a peripheral bus is a Peripheral Component Interconnect (PCI) bus, which has been used in information handling systems for many hardware and software generations. A current version of the PCI bus is the PCI Express (PCI-E) bus.

When an error occurs at a PCI device, certain error messages may be sent to the operating system for handling. In some instances, error messages from PCI devices result in a non-maskable interrupt (NMI) that stops operation of the information handling system, which is undesirable.

SUMMARY

In one aspect, a disclosed method for peripheral bus error containment and recovery is performed by a controller of a peripheral bus included in an information handling system. The method may include detecting, at the bus controller, a fatal device error at a downstream port of the controller. The downstream port may be populated by a bus device. Responsive to detecting the fatal device error, the method may include deactivating a data link layer for the downstream port, and setting a presence detect state bit to zero for the bus device. A first interrupt may be generated for the downstream port to an operating system executing on the information handling system. The first interrupt may cause the operating system to remove a device driver for the bus device.

In any embodiment, the method may further comprise after a delay period after the presence detect state bit is set to zero, setting the presence detect state bit to one. A second interrupt may be generated for the downstream port to the operating system. The second interrupt may cause the operating system to install the device driver for the bus device.

Other disclosed aspects include an article of manufacture including a non-transitory computer-readable medium storing instructions executable by a processor included in a bus controller, and a bus controller, including a processor having access to a memory, storing instructions executable by the processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
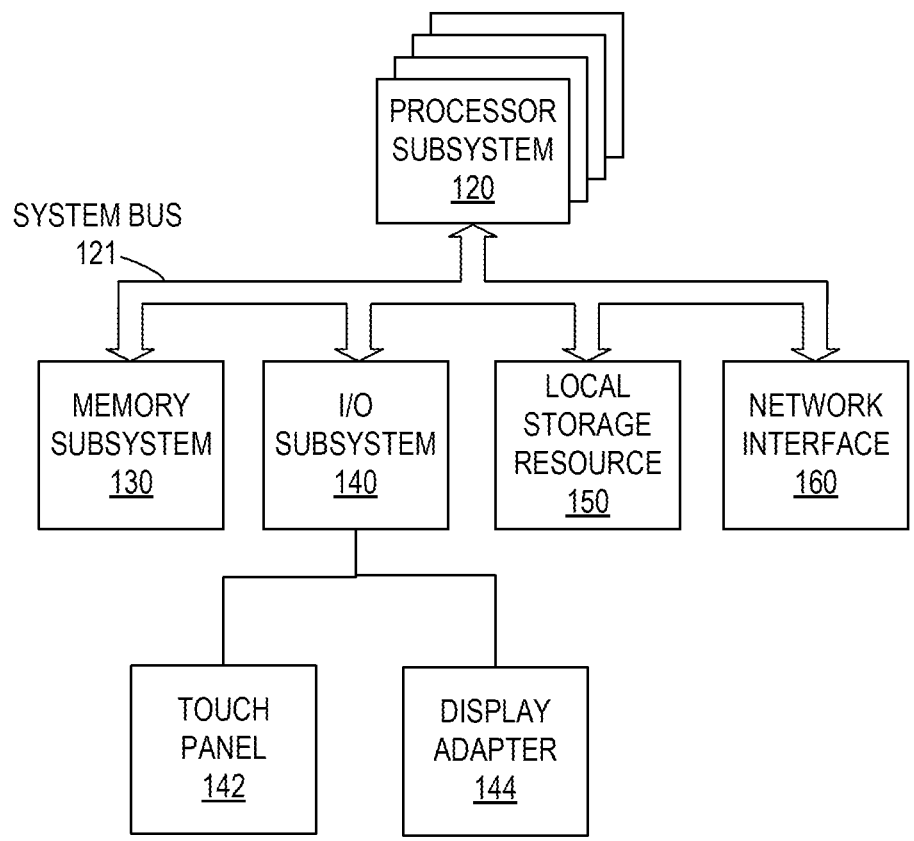
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

As noted previously, many information handling systems may include a peripheral bus, such as PCI-E. When errors occur at a peripheral bus device, such as a PCI-E device, certain error messages may be sent to the operating system for handling. For example, PCI-E specifies certain errors that result in error messages within the information handling system. In some instances, error messages from PCI devices, such as fatal device error messages, may result in a non-maskable interrupt (NMI). Even though the error at the peripheral bus device may be recoverable, an operating system executing on the information handling system may not be enabled to recover from the NMI. Thus, the NMI may halt execution of the operating system, which effectively stops operation of the information handling system, because no mechanism is available to recover from the error. Thus, the handling of such peripheral bus errors is undesirable in many information handling systems and associated operating systems.

The peripheral bus may originate at a root complex, which is a device that connects a processor of the information handling system and the memory of the information handling system to the peripheral bus fabric. In some embodiments, the root complex is included within the processor. The peripheral bus fabric may further include one or more bus switches, which may extend root ports of the root complex to additional downstream ports of the peripheral bus. Thus, peripheral bus ports for population with bus devices may be serviced by the root complex or the bus switch, which may include bus controller functionality. The bus controller functionality may include configuration and installation of new bus devices, as well as deconfiguration and removal of bus devices that are no longer present. The bus controller functionality may be supported by a driver architecture of the operating system, also referred to as a hardware abstraction layer (HAL). Certain peripheral bus architectures, such as PCI-E may support hot-plugging of bus devices that populate bus ports. However, as noted above, typical operating systems may be unable to recover from an NMI resulting from a device error, such as when the bus device stops operating properly.

As will be described in further detail herein, a bus controller for a peripheral bus in an information handling system may implement peripheral bus error containment and recovery, such as by containing, reporting, and recovering from an error at a bus device. The bus controller may be included in a root complex or a bus switch for the peripheral bus. The methods and systems disclosed herein for peripheral bus error containment and recovery may be agnostic to an operating system that currently supports the peripheral bus.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, a bus switch and a root port may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
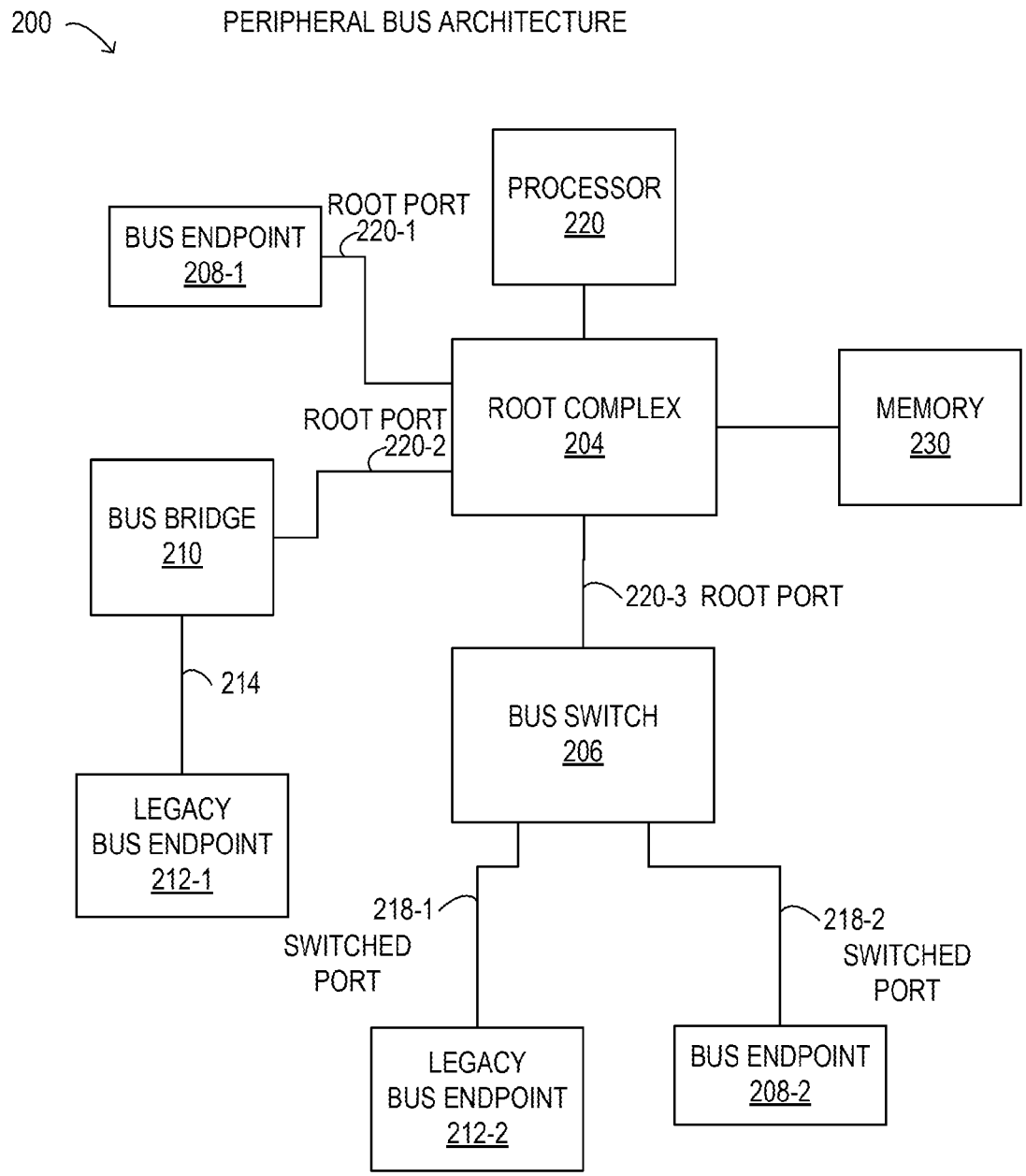
FIG. 2 is a block diagram of selected elements of an embodiment of a peripheral bus architecture included in an information handling system.
Figure 3:
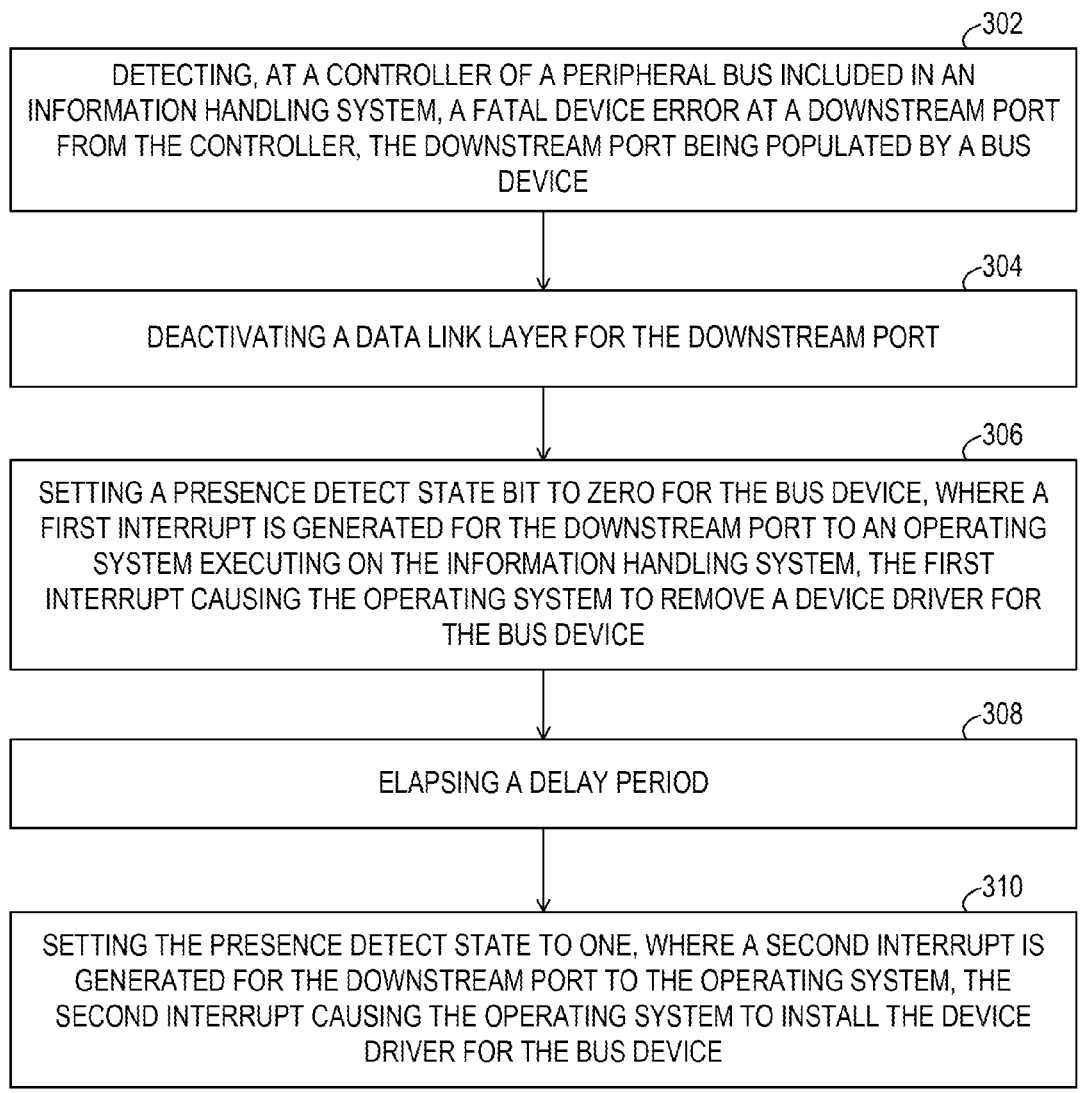
FIG. 3 is flowchart depicting selected elements of an embodiment of a method for peripheral bus error containment and recovery.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, PCI bus, PCI-E bus, HyperTransport (HT) bus, and Video Electronics Standards Association (VESA) local bus, among others.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to various transmission protocols and/or standards. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display that is driven by display adapter 144.

In operation, system bus 121 or I/O subsystem 140 may comprise a peripheral bus that enables information handling system 100 to accept and communicatively integrate peripheral bus devices. A bus controller included with the peripheral bus may be enabled for peripheral bus error containment and recovery, as described in further detail below.

Referring now to FIG. 2, a block diagram of selected elements of an embodiment of peripheral bus architecture 200 is illustrated. As shown, peripheral bus architecture 200 may be implemented in information handling system 100 (see FIG. 1). Peripheral bus architecture 200 includes processor 220, root complex 204, memory 230, and bus switch 206, among other elements. In various embodiments, peripheral bus architecture 200 may be an architecture for implementing a PCI-E bus.

In FIG. 2, root complex 204 is communicatively coupled to processor 220 and memory 230. Root complex 204 may be a device that generates peripheral bus transactions that originate from processor 220. Connections between root complex 204 and processor 220 and between root complex 204 and memory 230 may use high speed communication that supports data transfer rates for a peripheral bus. In some embodiments, root complex 204 may support direct memory access (DMA) to memory 230, with little or no processing involvement from processor 220 for DMA transfers. Root complex 204 may be implemented as an individual device. In particular embodiments, root complex 204 may be integrated within processor 220. Root complex 204 may accordingly instantiate root ports 220 for the peripheral bus that may be populated by a bus endpoint. Instantiated bus ports may be referred to as downstream ports, corresponding to a distal location of the downstream ports in peripheral bus architecture 200. A port of the peripheral bus may correspond to a slot for a bus endpoint, such as a plug-in card. As shown, root complex 204 instantiates root port 200-1 for bus endpoint 208-1. Root complex 204 may also instantiate root port 220-2 which connects to bus bridge 210. Bus bridge 210 may be a bridge between root port 220-2 of the peripheral bus and port 214 corresponding to a legacy bus that is populated by legacy bus endpoint 212-1. Root complex 204 may also instantiate root port 220-3 which is an upstream port of bus switch 206. Thus, root ports 220 may be downstream ports for root complex 204.

In peripheral bus architecture 200, bus switch 206 may represent a device that can instantiate multiple bus ports from an upstream port. For bus switch 206, root port 200-3 is an upstream port from root complex 204. Bus switch 206 instantiates switched ports 218, which are downstream ports for bus switch 206. Switched port 218-1 may support a legacy bus and be populated by legacy bus endpoint 212-2. Switched port 218-2 may be populated by bus endpoint 208-2.

As shown in FIG. 2, root complex 204 and bus switch 206 may include bus controller functionality for the peripheral bus. The bus controller functionality may include functionality to recognize new bus endpoints 208, 212, process data transactions and errors to and from bus endpoints 208, 212, and detect when bus endpoints 208, 212 have been removed. So-called "hot plug" functionality may comprise installation and removal of bus endpoints while peripheral bus architecture 200 is powered on. Accordingly, the bus controller functionality of root complex 204 and 206 may include hot-plug functionality for instantiated downstream ports. The bus controller functionality may include notifications and alerts, such as interrupts, to processor 220. The bus controller functionality may further include support for an operating system (not shown), for example, via operating system drivers for root complex 204 and bus switch 206, respectively.

In operation, a bus controller in peripheral bus architecture 200, such as root complex 204 or bus switch 206, may detect a fatal device error at a downstream port populated by a bus device. The fatal device error may be a PCI-E FATAL error, indicating that the bus device is no longer responsive to the PCI-E bus. Then, the bus controller may deactivate a data link layer for the downstream port corresponding to the bus device. Deactivating the data link layer may force the downstream port into a Data Link Layer Down state on a PCI-E bus. Then, the bus controller may set a presence detect state bit for the downstream port, which may be a Presence Detect State value for a PCI-E bus. The change in the Presence Detect State value may cause a Presence Detect Changed value for the PCI-E bus to be set to 1, indicating that the presence state for the downstream port has changed. When the Presence Detect Changed value is 1, a hot-plug interrupt may be generated. The operating system may then invoke a hot-plug interrupt handler to handle the hot-plug interrupt. Then, the operating system may detect that the presence detect state is zero and may proceed to unload or uninstall the operating system driver for the bus device. At this point, the bus device has been logically, but not physically, removed from the downstream port while the operating system continues to execute.

After some time has elapsed and the bus device continues to physically populate the downstream port, the bus controller may set the presence detect state to one. For the PCI-E bus, the change in the Presence Detect State value may cause a Presence Detect Changed value for the PCI-E bus to be set to 1, indicating that the presence state for the downstream port has changed. When the Presence Detect Changed value is 1, a hot-plug interrupt may be generated. The operating system may then invoke a hot-plug interrupt handler to handle the hot-plug interrupt. Then, the operating system may detect that the presence detect state is one and may proceed to load or install the driver for the bus device. In this manner, peripheral bus error containment and recovery may be accomplished by uninstalling and reinstalling the bus device upon a fatal bus error, rather than cause the operating system to cease executing.

Referring now to FIG. 3, a block diagram of selected elements of an embodiment of method 300 for peripheral bus error containment and recovery, as described herein, is depicted in flowchart form. In various embodiments, method 300 is performed by a bus controller included in information handling system 100 (see FIG. 1). It is noted that certain operations described in method 300 may be optional or may be rearranged in different embodiments.

In FIG. 3, method 300 may begin by detecting (operation 302), at a controller of a peripheral bus included in an information handling system, a fatal device error at a downstream port from the controller, the downstream port being populated by a bus device. Then, a data link layer may be deactivated (operation 304) for the downstream port. A presence detect state bit for the bus device may be set (operation 306) to one where a first interrupt is generated for the downstream port to an operating system executing on the information handling system, the first interrupt causing the operating system to remove a device driver for the bus device. Next, a delay period may elapse (operation 308). In some embodiments, the delay period may be between a few milliseconds and a few seconds. The bus device may populate the downstream port before, during, and after the delay period. Then, method 300 may set (operation 310) the presence detect state bit to one, where a second interrupt is generated for the downstream port to the operating system, the second interrupt causing the operating system to install the device driver for the bus device.

As described herein, a peripheral bus error containment and recovery system enables a bus device to experience a fatal bus error and recover without stopping execution of an operating system. When a fatal bus error is detected at the bus device, a bus controller may deactivate a data link layer for a downstream port populated by the bus device, causing an operating system device driver to be uninstalled for the bus device. Then, the operating system device driver may be reinstalled without physically removing the bus device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for peripheral bus error containment and recovery, comprising:
    detecting, at a controller of a peripheral bus included in an information handling system, a fatal device error at a downstream port from the controller, wherein the downstream port is populated by a bus device; and
    responsive to detecting the fatal device error:
        deactivating a data link layer for the downstream port; and
        setting a presence detect state bit to zero for the bus device, wherein a first interrupt is generated for the downstream port to an operating system executing on the information handling system, the first interrupt causing the operating system to remove a device driver for the bus device.

2. The method of claim 1, further comprising:
    after a delay period after the presence detect state bit is set to zero, setting the presence detect state bit to one, wherein a second interrupt is generated for the downstream port to the operating system, the second interrupt causing the operating system to install the device driver for the bus device.

3. The method of claim 1, wherein the peripheral bus is a peripheral component interconnect bus.

4. The method of claim 3, wherein the peripheral component interconnect bus is a peripheral component interconnect express bus.

5. The method of claim 1, further comprising:
    when the presence detect state bit is set to zero, causing a presence detect changed bit to be set to one, wherein the presence detect changed bit triggers the first interrupt.

6. The method of claim 2, further comprising:
    when the presence detect state bit is set to one, causing a presence detect changed bit to be set to one, wherein the presence detect changed bit triggers the second interrupt.

7. The method of claim 1, wherein the controller is included in at least one of: a root complex and a bus switch.

8. An information handling system for peripheral bus error containment and recovery comprising:
    a bus controller electronically coupled to a peripheral bus, the bus controller to:
    detect a fatal device error at a downstream port of the peripheral bus, wherein the downstream port is populated by a bus device, and wherein the peripheral bus is included in an information handling system; and
    responsive to detecting the fatal device error:
        deactivate a data link layer for the downstream port; and
        set a presence detect state bit to zero for the bus device, wherein a first interrupt is generated for the downstream port to an operating system executing on the information handling system, the first interrupt causing the operating system to remove a device driver for the bus device.

9. The information handling system of claim 8, wherein the bus controller is further to:
    after a delay period after the presence detect state bit is set to zero, set the presence detect state bit to one, wherein a second interrupt is generated for the downstream port to the operating system, the second interrupt causing the operating system to install the device driver for the bus device.

10. The information handling system of claim 8, wherein the peripheral bus is a peripheral component interconnect bus.

11. The information handling system of claim 10, wherein the peripheral component interconnect bus is a peripheral component interconnect express bus.

12. The information handling system of claim 8, wherein the bus controller is further to:
when the presence detect state bit is set to zero, cause a presence detect changed bit to be set to one, wherein the presence detect changed bit triggers the first interrupt.

13. The information handling system of claim 9, wherein the bus controller is further to:
when the presence detect state bit is set to one, cause a presence detect changed bit to be set to one, wherein the presence detect changed bit triggers the second interrupt.

14. The information handling system of claim 8, wherein the bus controller is included in at least one of: a root complex and a bus switch.

15. A bus controller for peripheral bus error containment and recovery, the bus controller to:
detect a fatal device error at a downstream port of the bus controller, wherein the downstream port is populated by a bus device, and wherein the bus controller is included in the information handling system; and
responsive to detecting the fatal device error:
deactivate a data link layer for the downstream port; and
set a presence detect state bit to zero for the bus device, wherein a first interrupt is generated for the downstream port to an operating system executing on the information handling system, the first interrupt causing the operating system to remove a device driver for the bus device.

16. The bus controller of claim 15, further to:
after a delay period after the presence detect state bit is set to zero, set the presence detect state bit to one, wherein a second interrupt is generated for the downstream port to the operating system, the second interrupt causing the operating system to install the device driver for the bus device.

17. The bus controller of claim 15, wherein the peripheral bus is a peripheral component interconnect bus.

18. The bus controller of claim 17, wherein the peripheral component interconnect bus is a peripheral component interconnect express bus.

19. The bus controller of claim 15, further to:
when the presence detect state bit is set to zero, cause a presence detect changed bit to be set to one, wherein the presence detect changed bit triggers the first interrupt.

20. The bus controller of claim 16, further to:
when the presence detect state bit is set to one, cause a presence detect changed bit to be set to one, wherein the presence detect changed bit triggers the second interrupt.

21. The bus controller of claim 17, wherein the bus controller is included in at least one of: a root complex and a bus switch.

* * * * *